United States Patent

Johannesson et al.

[11] Patent Number: 5,844,957
[45] Date of Patent: Dec. 1, 1998

[54] REACTOR CORE

[75] Inventors: Sven-Birger Johannesson; Lars-Erik Johansson, both of Västerås, Sweden

[73] Assignee: ABB Atom AB, Västerås, Sweden

[21] Appl. No.: 862,363

[22] Filed: May 23, 1997

Related U.S. Application Data

[63] Continuation of Ser. No. 551,699, Nov. 1, 1995, abandoned, which is a continuation of Ser. No. 269,113, Jun. 30, 1994, abandoned.

[30] Foreign Application Priority Data

Jul. 5, 1993 [SE] Sweden ................................. 9302305

[51] Int. Cl.$^6$ ................................. G21C 5/00; G21C 3/04
[52] U.S. Cl. .................... 376/370; 376/347; 376/434; 376/438
[58] Field of Search ................. 376/347, 434, 376/438, 440–444, 446–448, 370

[56] References Cited

U.S. PATENT DOCUMENTS

| | | | |
|---|---|---|---|
| 2,982,713 | 5/1961 | Sankovich et al. | 376/434 |
| 3,133,867 | 5/1964 | Frisch | 376/442 |
| 3,205,144 | 9/1965 | Jabsen | 376/434 |
| 3,211,621 | 10/1965 | Creagan | 376/438 |
| 3,257,285 | 6/1966 | Clifford et al. | 376/434 |
| 3,317,398 | 5/1967 | Hutter | 326/434 |
| 3,351,533 | 11/1967 | Rohlin | 376/347 |
| 3,713,974 | 1/1973 | Previti et al. | 376/441 |
| 3,808,098 | 4/1974 | Fredin | 376/444 |
| 4,585,614 | 4/1986 | Helmersson | 376/434 |
| 4,588,550 | 5/1986 | Blomstrand et al. | 376/438 |
| 4,795,608 | 1/1989 | Nyland | 376/444 |
| 4,970,047 | 11/1990 | Ueda et al. | 376/443 |
| 5,002,725 | 3/1991 | Lettau et al. | 376/444 |
| 5,100,611 | 3/1992 | Nyland | 376/444 |
| 5,345,486 | 9/1994 | Reese | 376/443 |

FOREIGN PATENT DOCUMENTS

| | | | |
|---|---|---|---|
| 923224 | 3/1973 | Canada | 376/435 |
| 1060507 | 7/1959 | Germany | 376/440 |
| 4117623 | 2/1993 | Germany | 376/434 |
| 0137886 | 8/1984 | Japan | 376/444 |
| 0039589 | 3/1985 | Japan | 376/438 |
| 1084591 | 4/1986 | Japan | 376/435 |
| 0023273 | 5/1987 | Japan | 376/434 |
| 1250788 | 10/1989 | Japan | 376/438 |
| 4050795 | 2/1992 | Japan | 376/438 |
| 5150073 | 6/1993 | Japan | 376/442 |
| 1116811 | 6/1968 | United Kingdom | 376/438 |

*Primary Examiner*—Harvey E. Behrend
*Attorney, Agent, or Firm*—Watson Cole Stevens Davis, P.L.L.C.

[57] ABSTRACT

A reactor core for a boiling water nuclear reactor includes a plurality of fuel assemblies (40) with a plurality of vertical fuel rods (10) and possibly occasional vertical water-filled rods or channels (32, 48, 49, 50, 51) which are surrounded by a fuel channel (1). Between the fuel assemblies (40) there are arranged water gaps (37a, 37b). At least one fuel assembly (40) has at least one outer, reduced corner portion (41) facing a gap (37a, 37bb), and the number of fuel rods (10) in each such fuel assembly (40) is reduced by a number corresponding to the number of reduced corner portions (41) therein.

6 Claims, 15 Drawing Sheets

REACTOR CORE

CROSS-REFERENCE TO RELATED APPLICATIONS

This is a continuation of application Ser. No. 08/551,699, filed Nov. 1, 1995, now abandoned, which was a continuation of application Ser. No. 08/269,113, filed Jun. 30, 1994, now abandoned.

TECHNICAL FIELD

The present invention relates to a reactor core for a boiling water nuclear reactor. Such a reactor core comprises a plurality of fuel assemblies with a plurality of vertical fuel rods and possibly occasional vertical water-filled rods which are surrounded by a fuel channel of substantially square cross section. Each rod is included in two rows perpendicular to each other and each rod includes a stack of circular-cylindrical pellets of a nuclear fuel, which stack is arranged in a cladding tube. The fuel assemblies are arranged in groups of four, forming a so-called supercell. A control rod is arranged centrally in the supercell.

BACKGROUND ART, PROBLEMS

When an atom of a fissionable substance, especially uranium-235, absorbs a neutron in its core and undergoes disintegration, there are formed, on average, two fission fragments with lower atomic weight and greater kinetic energy as well as a plurality of high-energetic neutrons. In a reactor core a sufficient number of assemblies with nuclear fuel are arranged to make possible a self-supporting fission reaction. The kinetic energy of the fission products escape as heat from the fuel rods. The reactor core is immersed in a coolant, for example water, which discharges the heat for utilization thereof. When the coolant is in the form of water, it also serves as a neutron moderator which retards the neutrons so as to increase the probability of fission reactions. If the reactor is to operate at a constant power level, the amount of fission-generating neutrons must be constant. This means that each fission reaction must gene-rate one neutron net, which in turn gives rise to a subsequent fission reaction such that the process becomes self-supporting. This is usually expressed such that the effective multiplication factor $k_{eff}$ must be equal to 1. The multiplication factor describes the ratio of the number of produced neutrons to the number of absorbed neutrons (or neutrons leaking out of the system).

During operation, the fissionable material is depleted while at the same time some of the fission products themselves are neutron-absorbing. Considering this fact, the reactor is normally provided from the start with an operating cycle with an excess of nuclear fuel, which initially entails too high a reactivity. For this reason, a control system is required which is capable both of maintaining the effective multiplication factor $k_{eff}$ exactly at 1.0 during operation and of reducing it to below 1 when the reactor is to be shut down. An important part of this reactivity control is taken care of by neutron-absorbing material, which absorbs or captures neutrons without any fission taking place.

At least part of the neutron-absorbing material is included in a plurality of the selectively operable control rods, which are pushed up from the bottom of the core to the necessary extent for control of the power level thereof and of the power distribution as well as for shutdown of the reactor. When the control rods are inserted into the core, the neutrons are absorbed which are a condition for the nuclear fission, the reactivity thus dropping. The higher neutron-absorbing effect the control rod has, the better is the so-called control rod effect thereof.

Some of the fuel rods may contain burnable absorption material for reducing the need of mechanical control. Such burnable absorber is transformed by absorption of neutrons into a material with a lower neutron-absorbing capacity. A well-known such material is gadolinium, usually in the form of gadolinium oxide. The burnable absorbers which are available as construction material, however, have a non-negligible residual absorption capacity. When using, for example, gadolinium as burnable absorber, the isotopes which have a high neutron capture cross section will be consumed relatively fast, whereas a residual absorption capacity remains as a result of continued neutron capture of the other isotopes.

When the need arises, the power production in the core must be capable of being rapidly interrupted, that is, the neutron supply and hence the power generation from nuclear fissions in the fuel be interrupted. There must always be sufficient shutdown margins such that the neutron supply does not unexpectedly start, resulting in powerful power generation, for example when the reactor vessel is opened and service work or refuelling is in progress.

A typical requirement by the authorities for operational approval is that if any one of the control rods has stuck in its outer position, then the shutdown margin shall correspond to a reactivity reduction of at least 0.38% ($k_{eff}$ is to be less than 0.9962). To obtain additional safety, these values are in practice often changed to 1% and 0.99, respectively.

It is known to improve the shutdown margin by incorporating some burnable neutron absorber in the fuel pellets, for example gadolinium. The burnable neutron absorber provides a reduction of the reactivity in both a cold and a hot state. Incorporating burnable absorbers in the fuel pellets is costly and, in addition, the burnable absorbers cannot be burnt up completely, which means that a certain percentage of neutron-absorbing material always remains, which reduces the reactivity in the hot operating state, which is not desirable.

An additional problem is that burnable neutron absorbers such as gadolinium oxide reduce the thermal conductivity of the fuel rods. Fuel rods which contain gadolinium oxide will have a considerably lower relative power because of the absorber, which has an unfavourable influence on the local power distribution. The larger the number of rods with burnable absorber and the larger the concentrations of burnable absorber, the greater will be the negative effect on the local power distribution.

To sum up, thus, the requirements imposed on the reactor core during operation and during shutdown often act in opposite directions, which has made the design of a core with an optimum configuration difficult.

Some of the known configurations, in which an improved shutdown has been aimed at, will be described below.

U.S. Pat. No. 4,863,680 discloses a fuel assembly in which an increased shutdown margin is achieved by arranging in the fuel assembly a number of small units with a small number of fuel rods in each unit. The units are arranged in a specific spaced relationship to each other. Centrally among the small units, a water rod is arranged. The shutdown margin can be ensured by varying the distances between the units in a suitable way.

U.S. Pat. No. 4,968,479 discloses a fuel assembly with a number of partial-length rods arranged around a centrally located water rod. The water rod has an upper part with a larger diameter and a lower part with a smaller diameter, where the smaller diameter substantially corresponds to the diameter of the fuel rods. Some of the rods are provided with intermediate zones of non-fissile material. These zones are arranged around the upper part of the water rod such that the effective multiplication factor, $k_{eff}$, in hot state can be effectively increased and in cold state be effectively reduced, whereby an improved shutdown margin is obtained. This is due to the fact that there is an excess of water around the water rod at the intermediate zones such that the water rod or the region around this rod is overmoderated in cold state, the neutron multiplication factor thus decreasing and the shutdown margin increasing. During the hot state of the reactor, especially when steam bubbles appear at the outer periphery of the water rod, the excessive water will disappear and the multiplication factor will recover.

U.S. Pat. No. 5,128,097 shows a fuel assembly which comprises central fuel rods arranged in a square lattice with a larger diameter than peripheral fuel rods arranged in an triangular lattice. The peripheral triangular lattice pattern makes it possible to increase the cooling region at the periphery, whereby the shutdown margin is increased. The amount of coolant at the centre of the fuel assembly is increased by the introduction of two water rods with an enlarged diameter in relation to the fuel rods.

SE 454 822 discloses a fuel assembly which comprises four sub-assemblies each provided with a reduced corner portion, wherein the reduced corner portions are facing each other forming an enlarged centre in the fuel assembly. The sub-assemblies are separated by a cruciform support means, the cruciform centre of which has been enlarged when being adapted to the reduced corner portions. The enlarged centre of the channel-formed support means contributes to the possibility of containing more non-boiling water in the centre part of the fuel assembly. The shutdown margin is thus improved in a cold reactor by containing the larger amount of water in the central part of the fuel assembly.

SE 423 760 discloses another fuel assembly with reduced corner portions. The fuel assembly comprises four sub-assemblies, of which at least one is provided with four reduced corner portions. The reason for the corner reduction in this design is a desire to accommodate a further fuel rod in a limited space. To achieve this, the rods are arranged in a partially triangular pattern instead of in a square pattern. It is then natural to adapt the corner portions of the sub-assembly to the triangular rod configuration. This fuel assembly gives no improved shutdown margin. Admittedly, more water is let into the core but it provides no reduction of the reactivity in cold state since the ratio of water to uranium is not changed.

SUMMARY OF THE INVENTION, ADVANTAGES

The object of the invention is to provide a reactor core with an improved shutdown margin in a cold state by increasing the amount of water in the core. To achieve an additionally improved shutdown margin in a cold state, the control rod effect can be improved. A fuel assembly which results in such a core is provided with at least one outer, reduced corner portion facing a gap, at least one fuel rod being removed from the corner portion. The reduced corner portion (or portions) entails (or entail) an increase of the cross section area in the moderator regions between the supercells in the reactor core. Each corner reduction entails an increase of the moderator region, which increase corresponds to at least the cross section area of a fuel rod.

More water in the core means that the reactivity in cold state decreases since the density of the water is then high and the diffusion length of the neutrons small. Also the water as such has a neutron-absorbing capacity. Taken together, this results in an improved shutdown margin in cold state.

Improved control rod effect means that the control rod is allowed to reach, that is absorb, more neutrons, This is brought about by reducing the mean distance of the fissile material, that is, of the neutron generators, to the control rod and hence also the distance of the neutrons to the control rod. This, in turn, is achieved by removing at least one fuel rod in one or a few of the outer corners of the fuel assembly, facing away from the centre of the control rod, the remaining fissile material thus being arranged closer to the control rod. To obtain an improved shutdown margin by both admitting more water into the core and by improved control rod effect, at least that outer corner which is arranged at the largest distance from the control rod is reduced.

By the corner reduction, more non-boiling water can be admitted into the reactor core. The change of the ratio of the volume of boiling water to the volume of non-boiling water provides an increase of the reactivity in hot state and a greater reduction of the reactivity in cold state relative to the increase in hot state. Since the reactivity in hot state is predetermined, an increased hot reactivity can be compensated for by reducing the medium enrichment content in the fuel. By the corner reduction, the invention allows access to a larger volume of non-boiling water than when replacing fuel rods by water rods, which is described under the background art, since access is also provided to the volume available outside the rod. It is important for the invention that the space for the non-boiling water has a certain size in order to obtain a considerably improved moderation in hot state and a considerably reduced reactivity in cold state.

Fuel assemblies in asymmetrical core lattices, that is, core lattices in which the water gaps between the fuel assemblies in a supercell, referred to as control rod gaps, are wider than the water gaps between the supercells, referred to as narrow gaps, usually have an uneven enrichment distribution. This is due to the fact that when dimensioning asymmetrical core lattices, an inferior power, caused by inferior moderating conditions at the outer part of the supercell, is compensated by a higher enrichment content at that part. The corner reduction according to the invention is particularly advantageous with this type of lattice since it makes it possible to reduce the enrichment content in those rods which are arranged nearest the reduced corner portion (or portions) because of the increased amount of non-boiling water which has a better moderating ability than boiling water. A corresponding increase of the enrichment content is made in the opposite part of the assembly (opposite in relation to the reduced corner) for maintaining the medium enrichment, which results in an equalization of the enrichment distribution in asymmetrical core lattices.

The changed enrichment distribution, in both symmetrical and asymmetrical core lattices, results in fissile material being moved nearer the control rod centre such that the control rod effect can be improved, the reactivity in cold state thus being reduced.

According to an advantageous embodiment of the invention, the enrichment content in those rods which are arranged nearest to a reduced corner portion, located at a maximum distance from the control rod, with a removed fuel rod, is determined according to the following empirical relationship:

$$B = A \cdot F_k(F_S(a/b-1)+1)$$

where
B=enrichment content in a rod arranged near a reduced corner portion with one fuel rod removed,
A=enrichment content in the corresponding rod in a non-reduced corner portion in the fuel assembly which is opposite to the reduced corner portion,
The factor $F_k$ describes how the ratio B/A is influenced by a reduced corner portion in a lattice with symmetrical water gaps,
The factor $F_s$ indicates a symmetry factor which describes how the ratio B/A is dependent on the ratio between the control rod gaps and the narrow gaps for a lattice with asymmetrical water gaps
a=gap width, control rod gap
b=gap width, narrow gap.

When the whole core is provided with the type of fuel assembly described above, the reactivity in cold state is further reduced by cooperation between a plurality of reduced corners, whereby considerably enlarged moderator regions are obtained.

In comparison with known technical solutions regarding an improved shutdown margin, the invention has a number of considerable advantages. The main advantage is that the solution entails a considerable simplification of the shape of the fuel assembly compared with previous solutions, while at the same time the reduction of the total amount of fissile material is limited and the safety requirements for shutdown are met more than satisfactorily.

Further, it is an advantage that more non-boiling water, by the corner reduction, can be led into the core.

The enlarged moderator region entails an advantage since a large coherent volume absorbs more neutrons than several smaller moderator regions with the same total volume. This is due to the diffusion length of the neutrons becoming shorter since, because of the increased quantity of water, they are retarded and absorbed before reaching the fissionable fuel. In cold state, the moderator region will thus to a certain extent serve as a neutron trap.

Further, the enrichment content at a reduced corner portion can be reduced and at the corner opposite to the reduced corner portion be increased. This is a considerable advantage especially in asymmetrical lattices since in this way an equalization of the enrichment contents is obtained.

In those cases where at least that corner which is located at the greatest distance from the control rod is reduced, the amount of burnable absorbers, such as gadolinium, in the corner can be reduced, which reduces the negative influence exerted by these absorbers on the reactivity in hot state. This is due partly to more water being led into the core because of the corner reduction, and partly to fissile material being moved nearer the control rod. The reduced need of burnable absorbers is also cost-saving.

An improved control rod effect and hence a better shutdown magin are obtained by removing fuel rods such that the mean distance of the fissile material to the control rod is reduced. Also the reduction of the enrichment contents in fuel rods arranged adjacent reduced corners and the corresponding increase of the enrichment contents in corresponding rods at opposite corners, such that higher enrichment contents are arranged nearer the control rod (i.e. fissile material nearer the control rod), contribute to improve the control rod effect.

A further advantage is that the fuel assembly according to the invention can be used in cores of existing reactors, which is of particular value.

The invention will be explained in greater detail by description of several embodiments with reference to the accompanying drawings.

DESCRIPTION OF THE PREFERRED EMBODIMENTS

Figure 1:
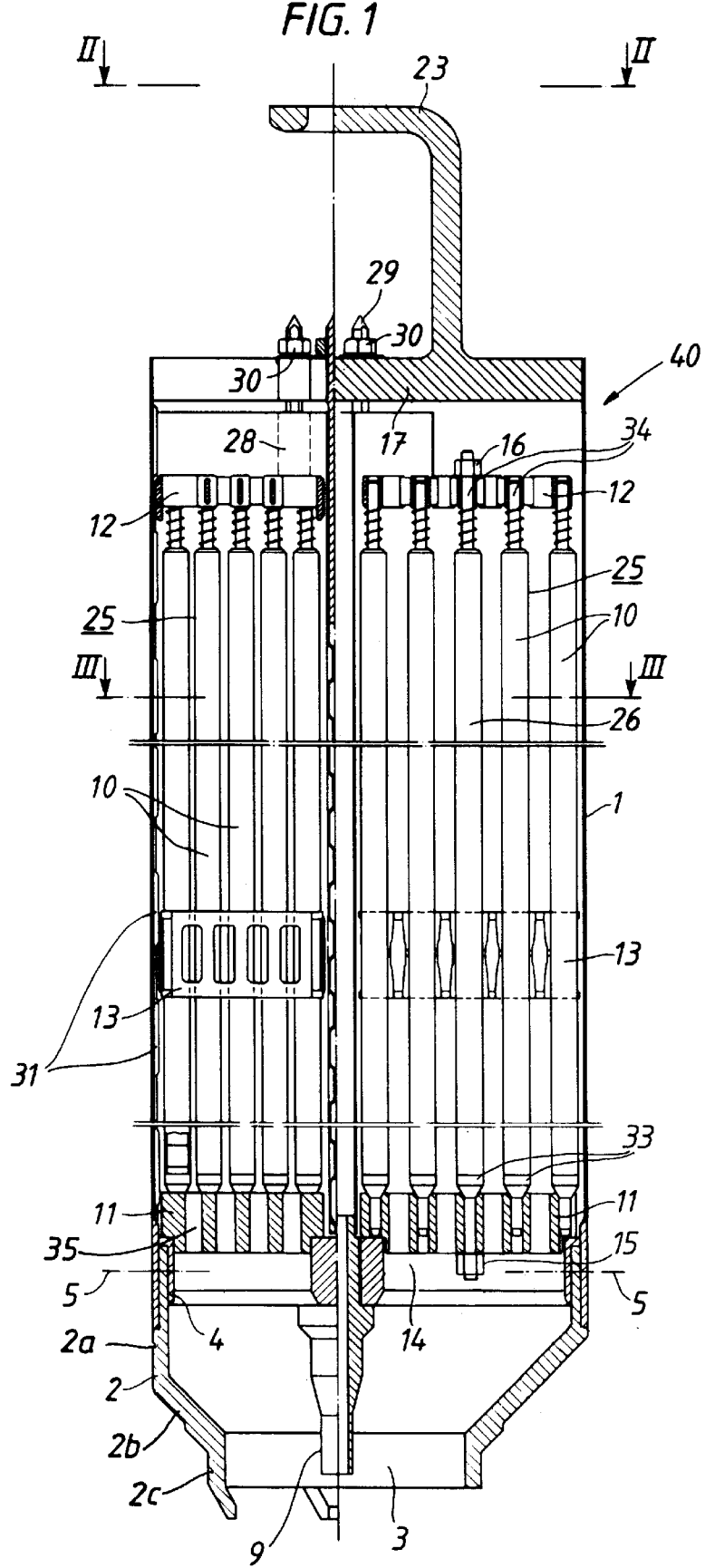
FIG. 1 shows in a vertical section through the line I—I in FIG. 2 an embodiment of a composed fuel assembly built up from four sub-assemblies for a boiling water reactor according to the invention.
Figure 2:
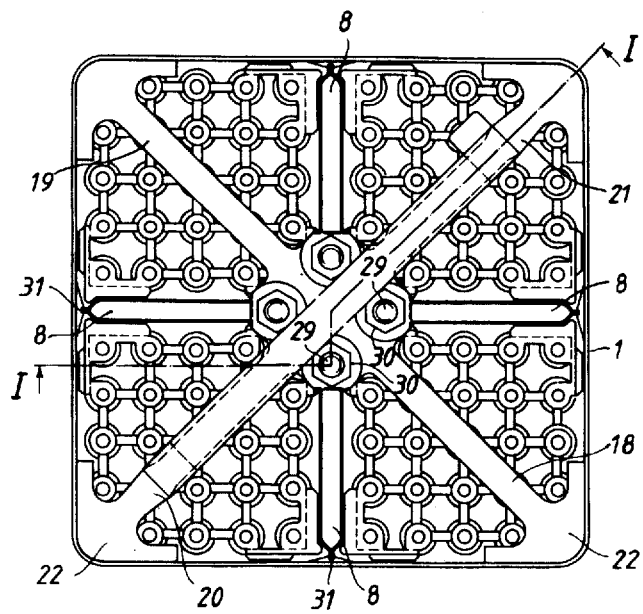
FIG. 2 shows the same fuel assembly in a view perpendicular to a horizontal plane through the line II—II in FIG. 1.
Figure 3:
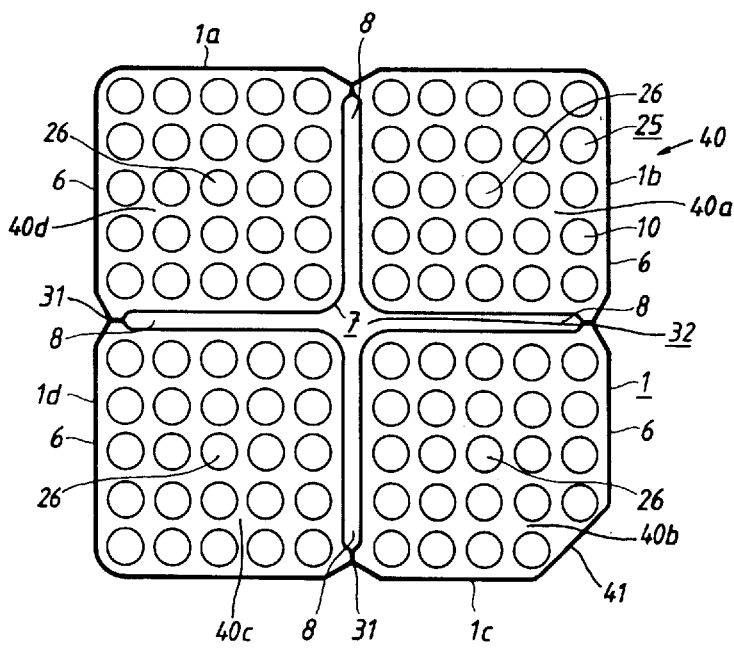
FIG. 3 shows a horizontal section through the line III—III in FIG. 1.

FIGS. 1, 2 and 3 show a fuel channel 1 with a substantially square cross section. The fuel channel 1 surrounds, with no significant play, an upper square portion 2a of a bottom part 2 which otherwise comprises a conical portion 2b and a cylindrical portion 2c. The bottom part 2 has a downwardly facing inlet opening 3 for cooling water. Besides supporting the fuel channel, the bottom part 2 also supports a supporting plate 4. At the bottom the fuel channel 1 has a relatively thick wall portion which is fixed to the bottom part 2 and the supporting plate 4 by means of a plurality of horizontal bolts indicated by means of dash-dotted lines 5.

From FIG. 3 it is clear that the fuel channel 1 according to the invention is provided with a reduced corner portion 41. By means of a hollow support member 7 with a cruciform cross section, the fuel channel 1 is divided into four vertical channel-formed parts 6 with at least substantially square cross section. The support member 7 is welded to the four walls 1a, 1b, 1c, 1d of the fuel channel 1 and has four hollow wings 8. The central channel formed by the support member 7 is designated 32 and is connected at the bottom to an inlet tube 9 for moderator water. Each tubular part 6 comprises a bundle 25 containing twenty-five fuel rods 10. The rods 10 are arranged in a lattice in which each rod 10 is included in two rows perpendicular to each other, apart from the reduced corner portion 41 where one rod 10 has been removed.

From FIG. 1 it is clear that each bundle 25 is arranged with a bottom tie plate 11, a top tie plate 12 and a plurality of spacers 13. A fuel rod bundle 25 with bottom tie plate 11, top tie plate 12, spacer 13 and fuel channel part 1 forms a unit which in this application is referred to as a sub-bundle, whereas a unit comprising four such sub-assemblies is referred to as a fuel assembly. In the drawings, fuel assemblies are denoted by the reference numeral 40 and sub-assemblies by 40a–d. A unit comprising four fuel assemblies 40 and a control rod 38 arranged centrally therebetween constitutes a supercell.

The four bottom tie plates 11 are supported in the fuel assembly 40 by the supporting plate 4 and are each partially inserted into a respective square hole 14 therein. In each sub-assembly 40a–d, at least one of the fuel rods 10 is formed with relatively long, threaded end plugs 33 and 34 of solid cladding material, the lower end plug 33 being passed through the bottom tie plate 11 and provided with a nut 15 and the upper end plug 34 being passed through the top tie plate 12 and provided with a nut 16. In the embodiment shown, the centre rod 26 in each sub-assembly is formed in this way. This rod 26 also serves as a spacer holder rod. The holes for the passage of the water through the bottom tie plate 11 are designated 35.

From FIGS. 1 and 2 it is clear how an upper end portion of the fuel channel 1 surrounds a cruciform lifting plate 17 with four horizontal arms 18, 19, 20 and 21 which extend from a common central portion. At its outer end each arm 18–21 has an arrowhead-like portion 22, each of which, at respective corners of the fuel channel 1, makes contact with the inner wall surface of the fuel channel 1. A lifting handle 23 is fixed to the arms 18–21. The lifting plate 17 and the handle 23 together form a lifting member of steel cast in one piece. The lifting plate 17 is fixed to the support member 7 by inserting four vertical bars 28 into respective wings 8 of the support member 7 and welding them thereto. At its top each bar 28 has a vertical, bolt-like portion 29 which is passed, with a play, through a corresponding hole in the central portion of the lifting plate 17 and provided with a nut 30. As is clear from the figures, the fuel channel 1 is provided with indentations 31, intermittently arranged in the longitudinal direction, to which the support member 7 is welded.

Figure 4:
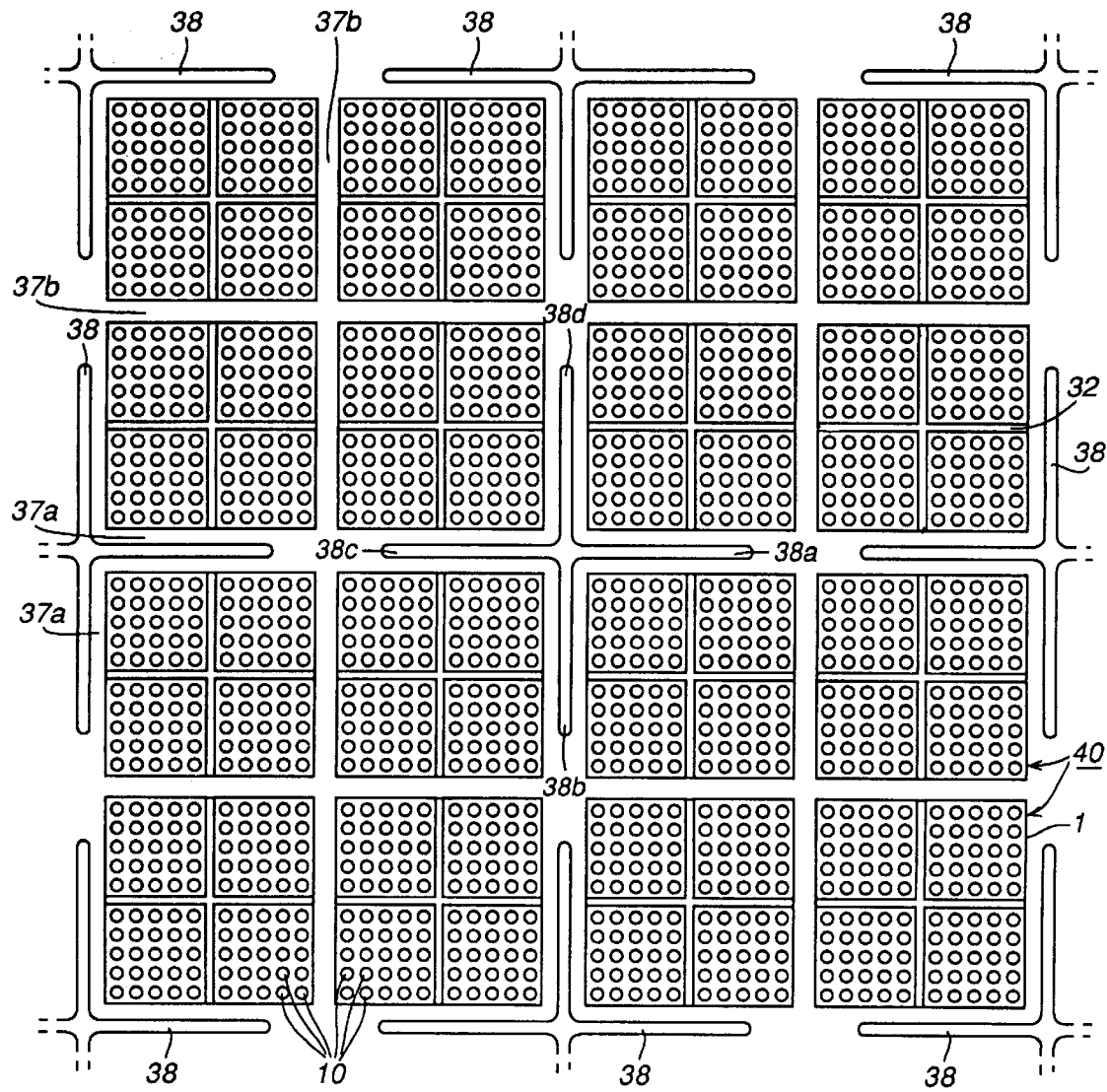
FIG. 4 shows a horizontal section of part of a reactor core with fuel assemblies according to the prior art arranged in the core.

FIG. 4 shows part of an asymmetrical core lattice according to the prior art. The section comprises sixteen fuel assemblies 40. The spaces between the fuel rods 10 within each sub-assembly 40a–d are traversed by water, as is the cruciform channel 32 in the fuel assembly 40. The gaps between the fuel assemblies 40 are also traversed by water. In an asymmetrical core lattice, the control rod gaps 37a, into which the control rods 38 can be inserted, are wider than the narrow gaps 37b, into which no control rods 38 can be inserted. In a symmetrical core lattice, the control rod gaps 37a and the narrow gaps 37b have the same width. The control rods 38 have blades 38a–d which form a rectilinear cross.

Figure 5:
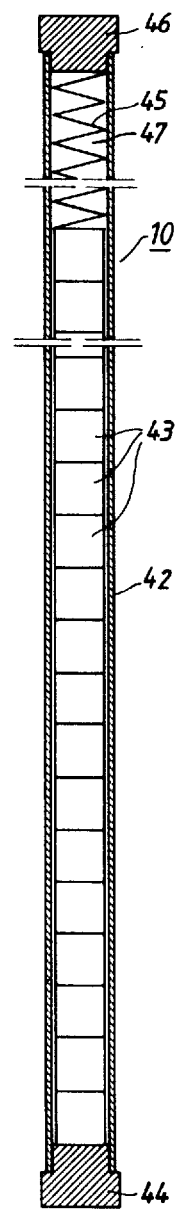
FIG. 5 shows a fuel rod in a vertical section.

As is clear from FIG. 5, each fuel rod 10 includes a cladding tube 42 and a large number of circular-cylindrical pellets 43 stacked on top of each other in the axial direction of the tube 42. The pellets 43 which are located nearest each end of the fuel rods 10 may possibly consist of natural uranium whereas the rest of the pellets 43 in a conventional manner consist of uranium dioxide enriched with respect to uranium-235. The lowermost pellet rests rigidly on an end plug 44 welded to the lower end of the rod 10, and the uppermost pellet is pressed downwards by a spiral spring 45, which is tensioned against an end plug 46 welded to the upper end of the tube 42, thus obtaining a plenum 47 filled with helium. This plenum 47 without nuclear fuel material is thus not included in the active length of the fuel rod 10. Pellets 43 of natural uranium are considered as belonging to the active length of the fuel rod 10.

Figure 6:
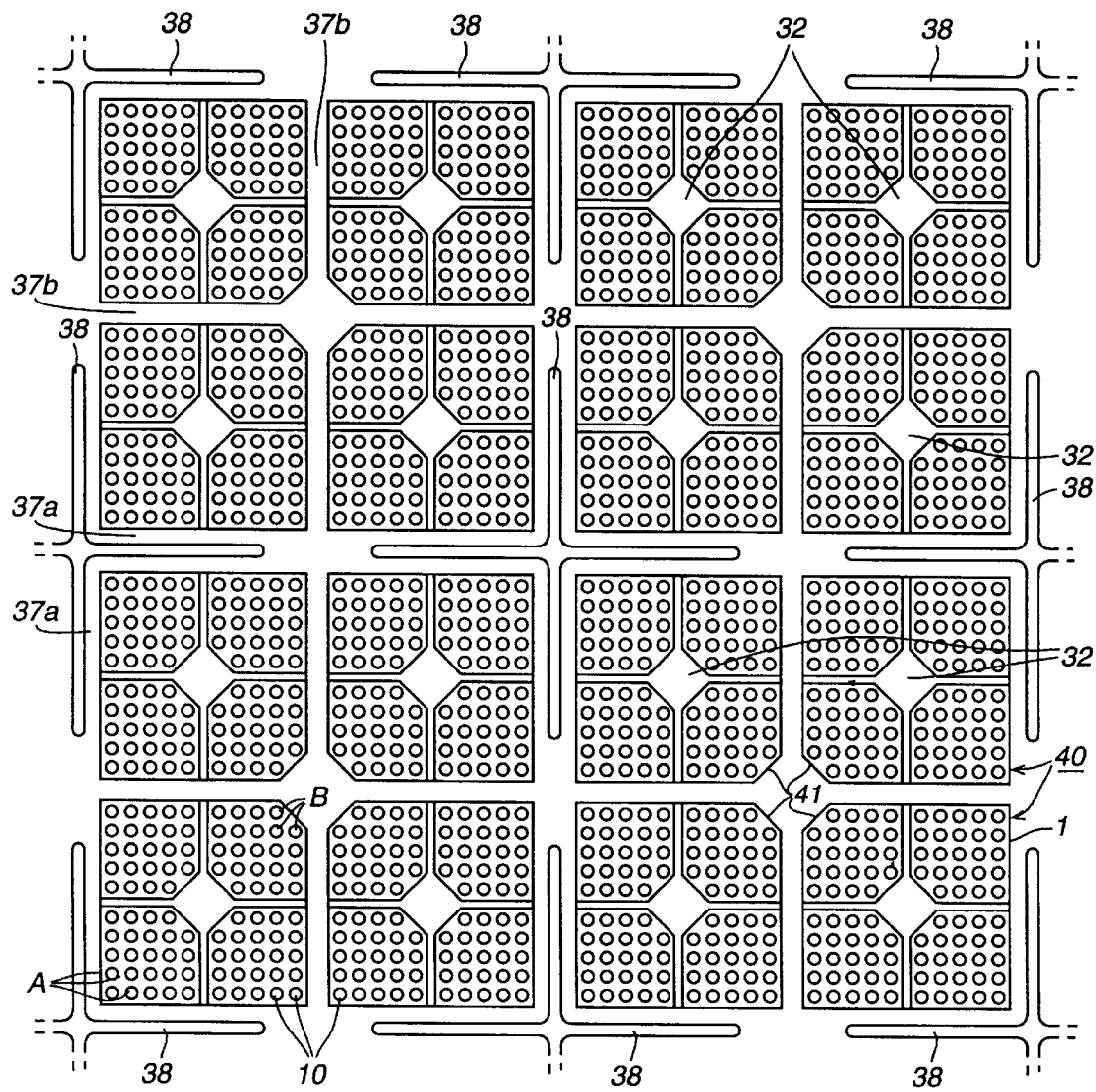
FIG. 6 shows in a horizontal section a particularly advantageous embodiment of part of a reactor core according to the invention.

FIG. 6 shows a particularly advantageous embodiment of the invention. Contrary to the fuel assemblies shown in FIG. 4, the fuel assemblies 40 are provided with an enlarged centre by forming the cruciform channel 32 with inner corner reductions in the fuel assembly 40 (prior art according to Swedish patent 454 822), and further each assembly 40 is provided with a reduced corner portion 41, thus displaying a pentagonal configuration. The reduced corner portion 41 consists of that corner portion 41 in the supercell which is arranged at the largest distance from the centre of the control rod 38. The reduction of the corner portion 41 is combined with removal of at least one fuel rod 10 at the reduced corner portion 41 such that the rectangular rod positioning, with rods arranged in rows perpendicular to each other, can be maintained.

The corner reduction permits more non-boiling water to be introduced into the core. In hot state with a mixture of steam and water, this gives a better neutron moderation and increased reactivity. In cold state the neutrons have a considerably shorter diffusion length. This means that the corner reduction contributes to an increased neutron absorption, whereby the reactivity in cold state is reduced and the shutdown margin is increased.

When applying the invention an additionally improved shutdown margin is achieved by the removal of a fuel rod 10 such that the mean distance of the fissile material to the control rod 38 in a supercell is reduced, whereby the neutron-absorbing effect of the control rod 38 is improved and thus also the shutdown margin in cold state. A still further improvement of the shutdown margin is obtained by reducing the enrichment content in the fuel rods 10 arranged nearest the reduced corner portion (or portions) 41 and increasing the enrichment content in the corresponding fuel rods 10 in that corner in the fuel assembly 40 which is opposite to the reduced corner 41 such that the mean distance of the fissile material to the control rod 38 is further reduced.

In asymmetrical core lattices, the reduction of the enrichment content at the reduced corner portion 41 is an advantage also in that an equalization of the enrichment contents in the fuel assemblies 40 is obtained.

Figure 7:
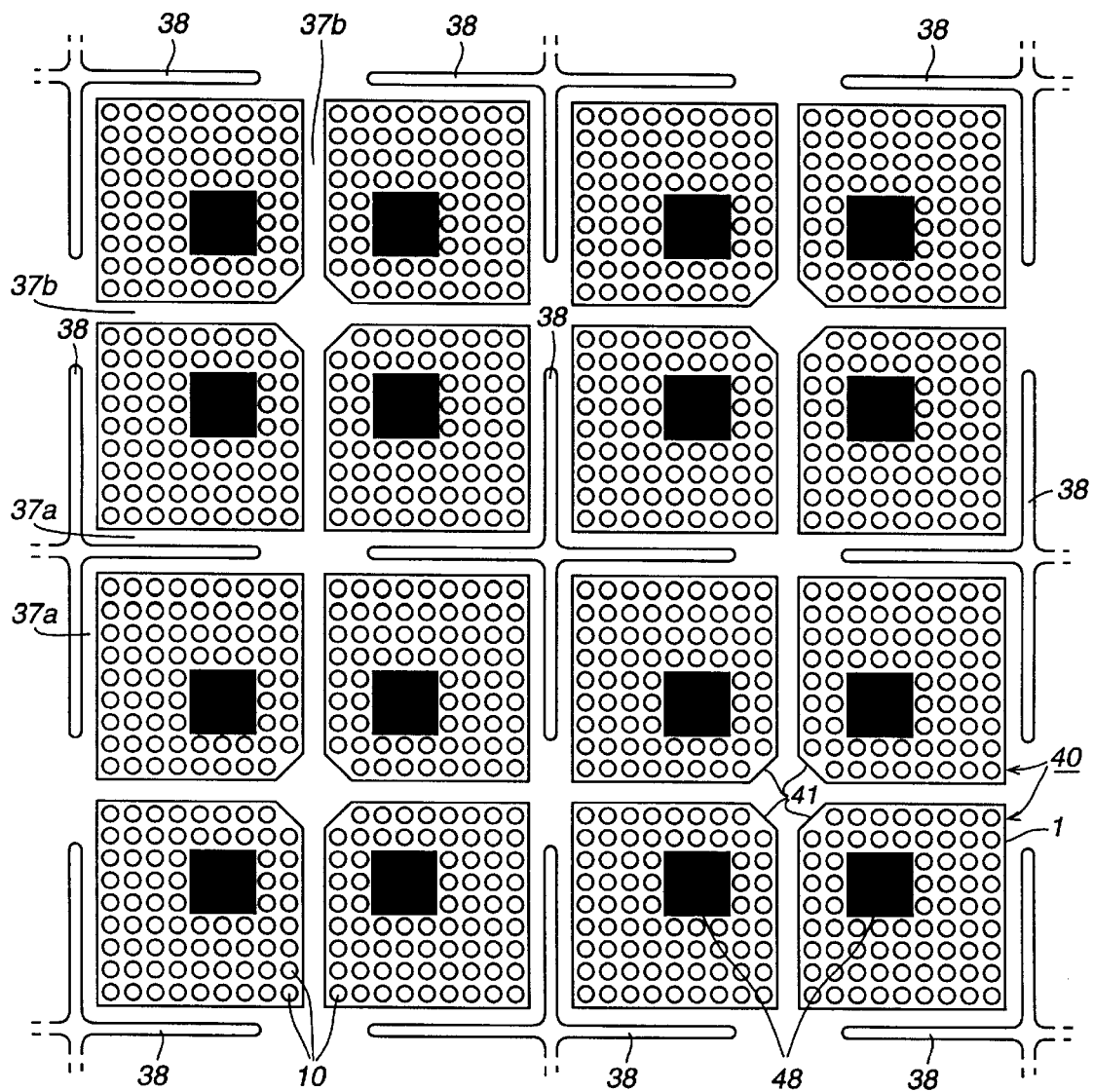
FIGS. 7–17 show in a horizontal section alternative embodiments of part of a reactor core according to the invention.
Figure 8:
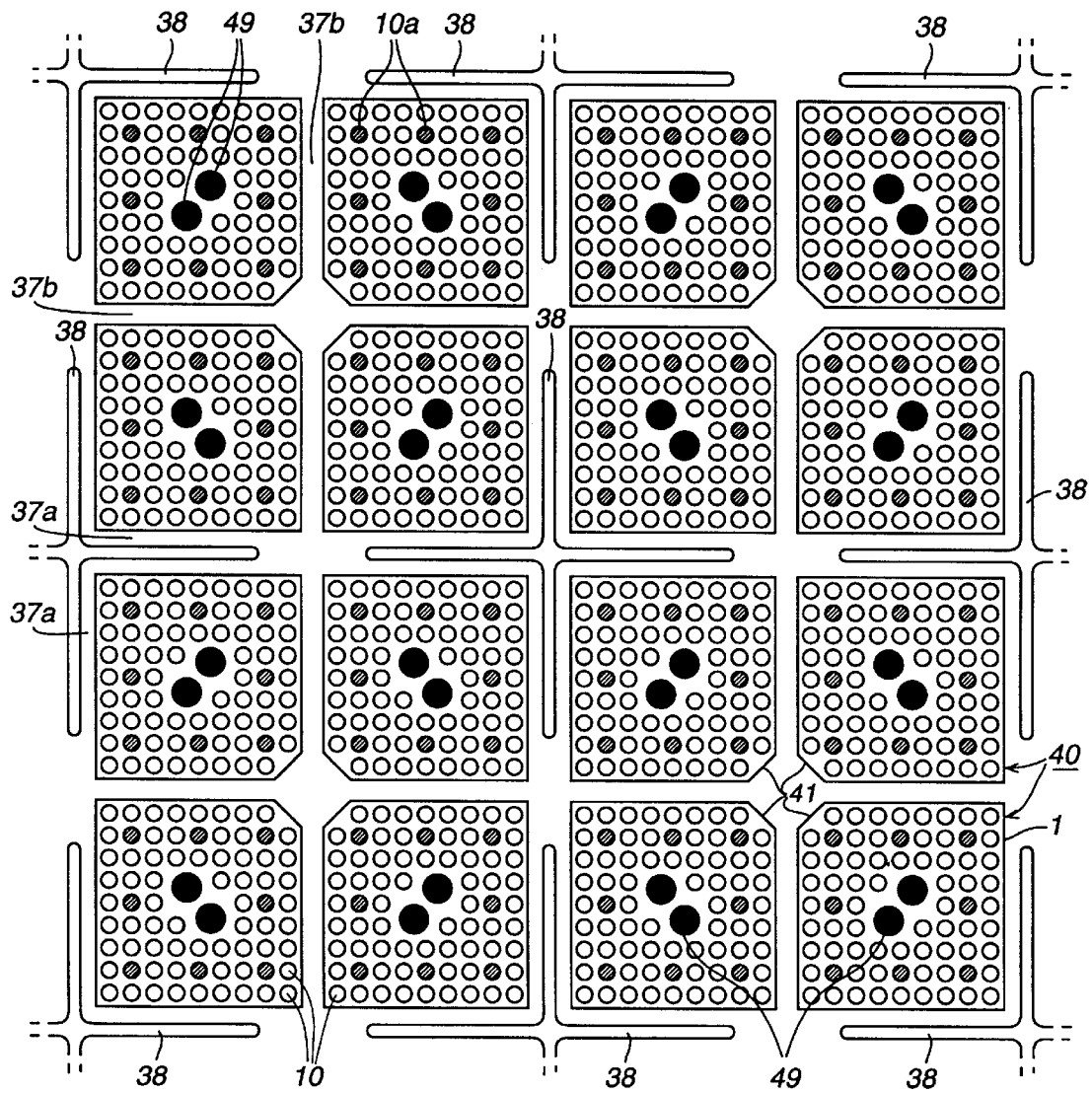

FIGS. 7 and 8 illustrate in an asymmetrical core lattice other fuel assemblies 40, each having a reduced corner portion 41, suitable for use according to the present invention. The fuel assembly 40 according to FIG. 7 is provided with an internally arranged vertical channel 48, through which water is led in a vertical direction from the bottom and upwards through the assembly 40. The channel 48 has a substantially square cross section corresponding to nine removed fuel rods 10 and is displaced in relation to the centre of the assembly 40. FIG. 8 shows a fuel assembly 40 which is provided with two centrally arranged vertical water rods 49, through which water is led in a vertical direction from the bottom and upwards through the assembly 40. The water rods 49 have a diameter which is somewhat larger than the diameter of the fuel rods 10 and are designed with a substantially circular cross section. The arrangement of the two water rods 49 centrally in the assembly 40 takes place at the expense of seven fuel rods 10. The assembly 40 also includes partial-length fuel rods 10a, which are dashed in FIG. 8.

Figure 9:
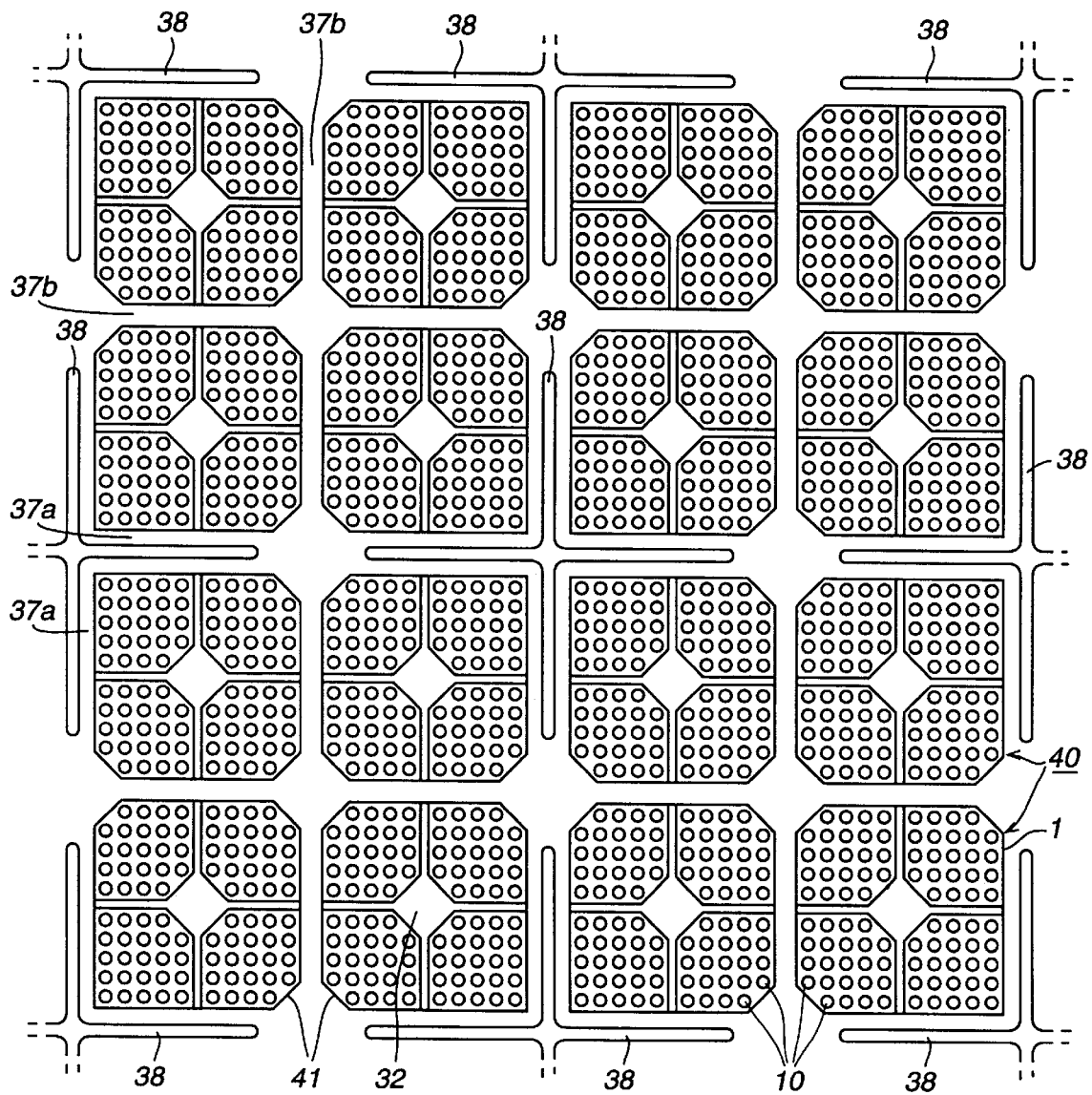
Figure 10:
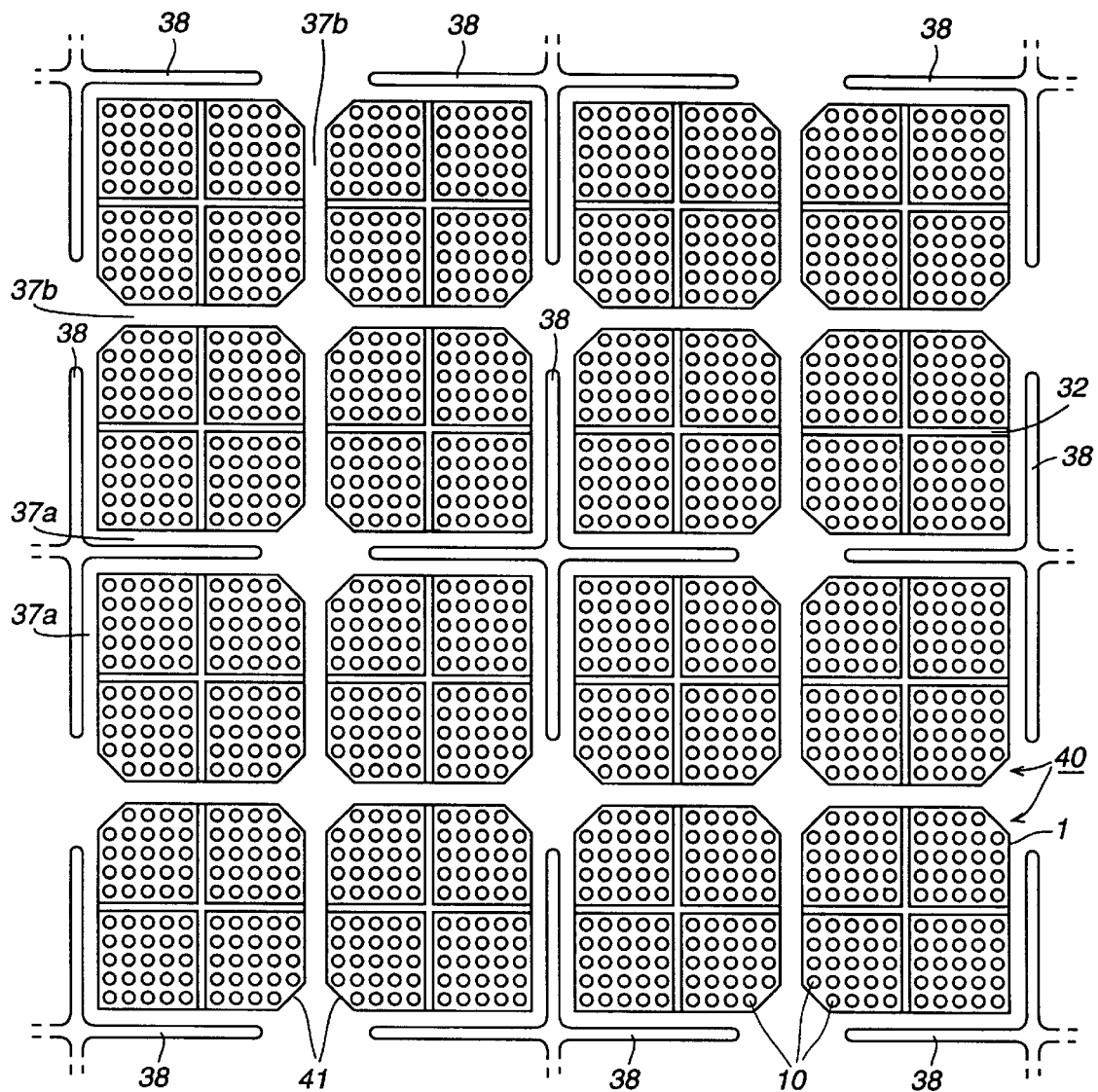
Figure 11:
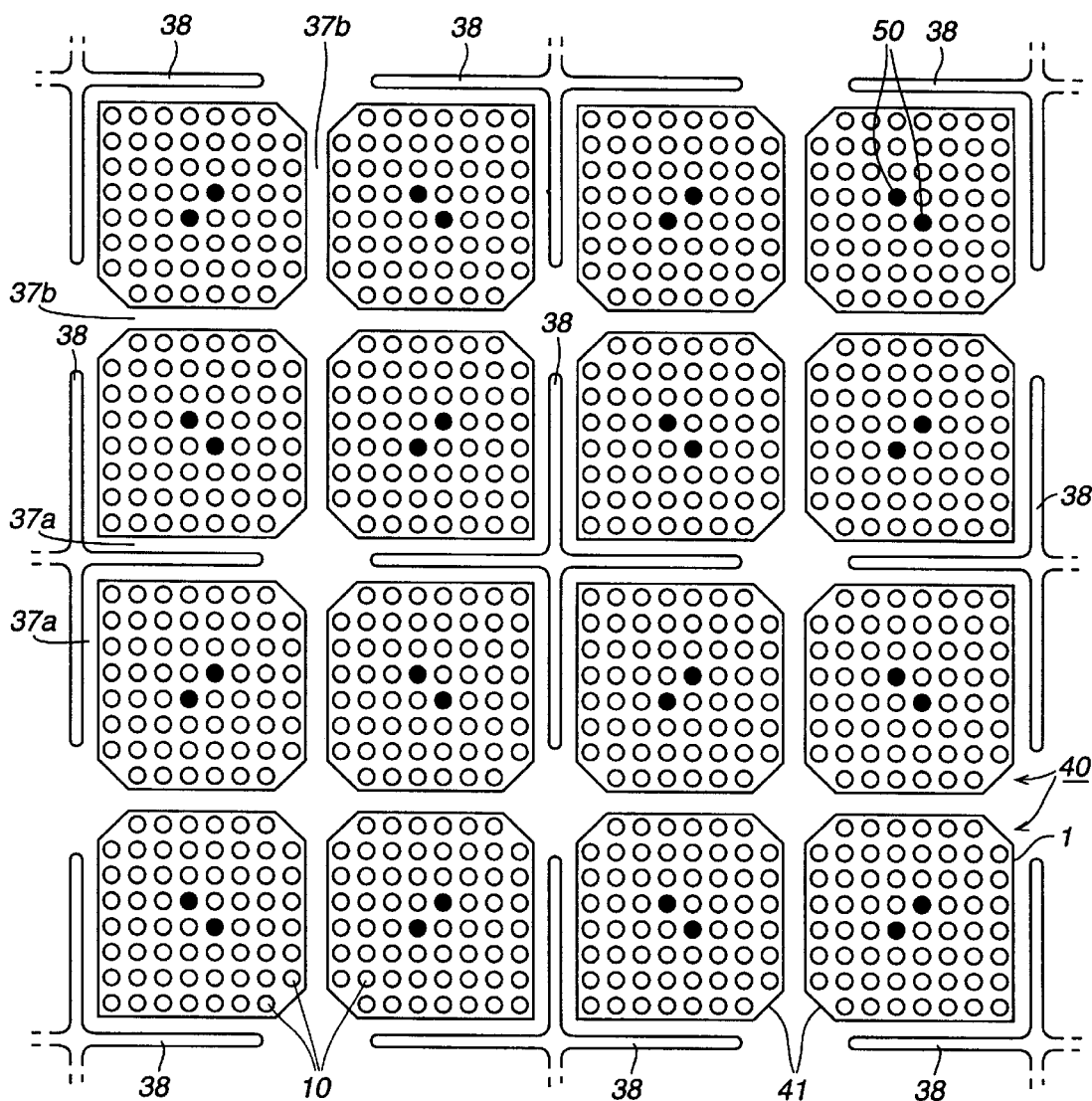

FIGS. 9, 10 and 11 show in an asymmetrical core lattice fuel assemblies 40 with three reduced corner portions 41, thus displaying a heptagonal configuration. The reduced corner portion 41 are arranged facing away from the centre of the control rod 38. The fuel assembly 40 according to FIG. 9 is of the same type as those shown in FIG. 6. The fuel assembly 40 according to FIG. 10 is of the same type as those shown in FIG. 4. The embodiments according to FIGS. 6–11 are also suitable for symmetrical core lattices, particularly the embodiments in FIGS. 9–11 since the removal of three corners out of four means that the symmetrical enrichment distribution can be retained largely symmetrical. The fuel assembly 40 according to FIG. 11 is provided with two centrally arranged vertical water rods 50 through which water is led in a vertical direction from the bottom and upwards through the assembly 40. The water rods 50 have a diameter which approximately corresponds to the diameter of the fuel rods 10 and are designed with substantially circular cross section. The arrangement of the two water rods 50 centrally in the assembly 40 takes place at the expense of two fuel rods 10.

Figure 12:
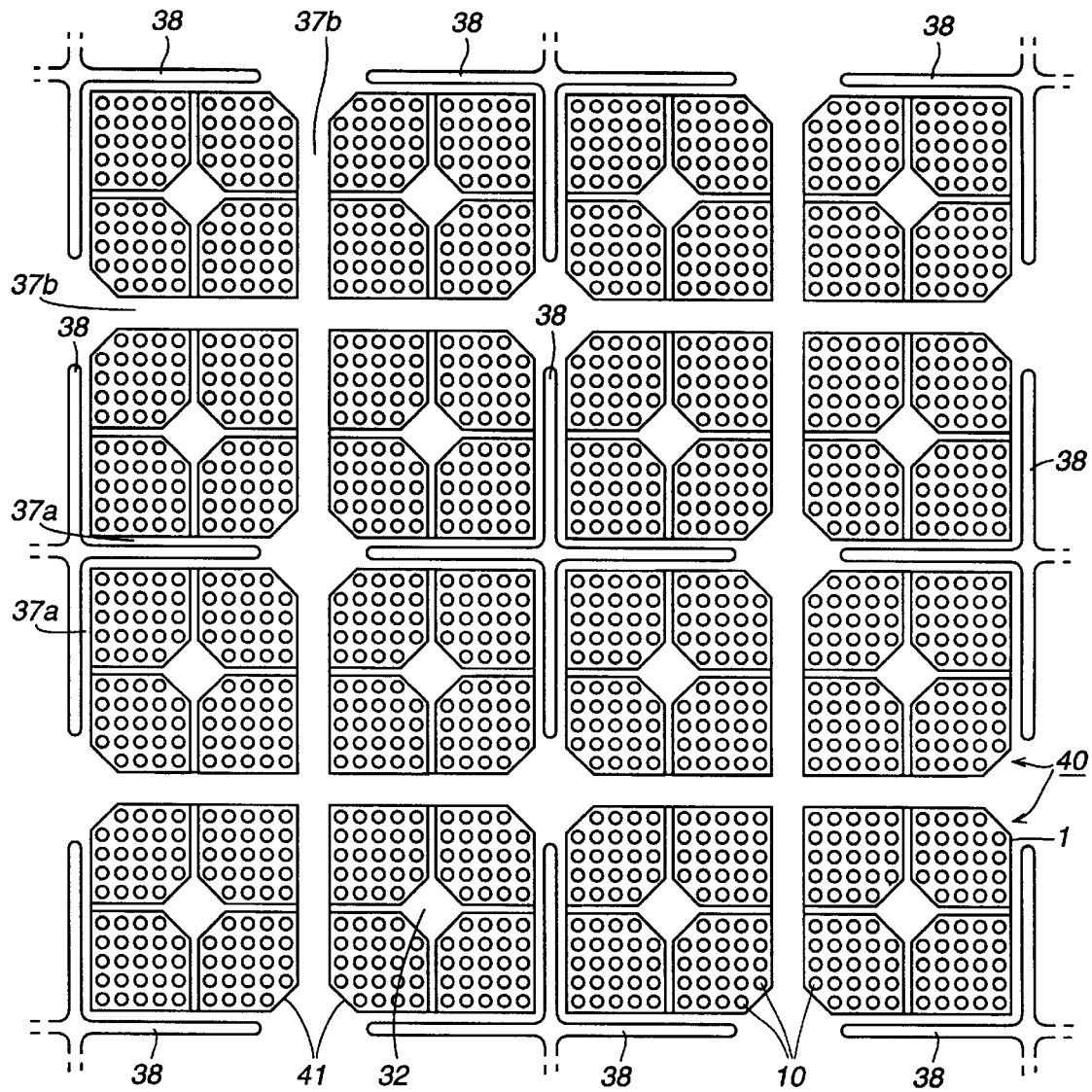
Figure 13:
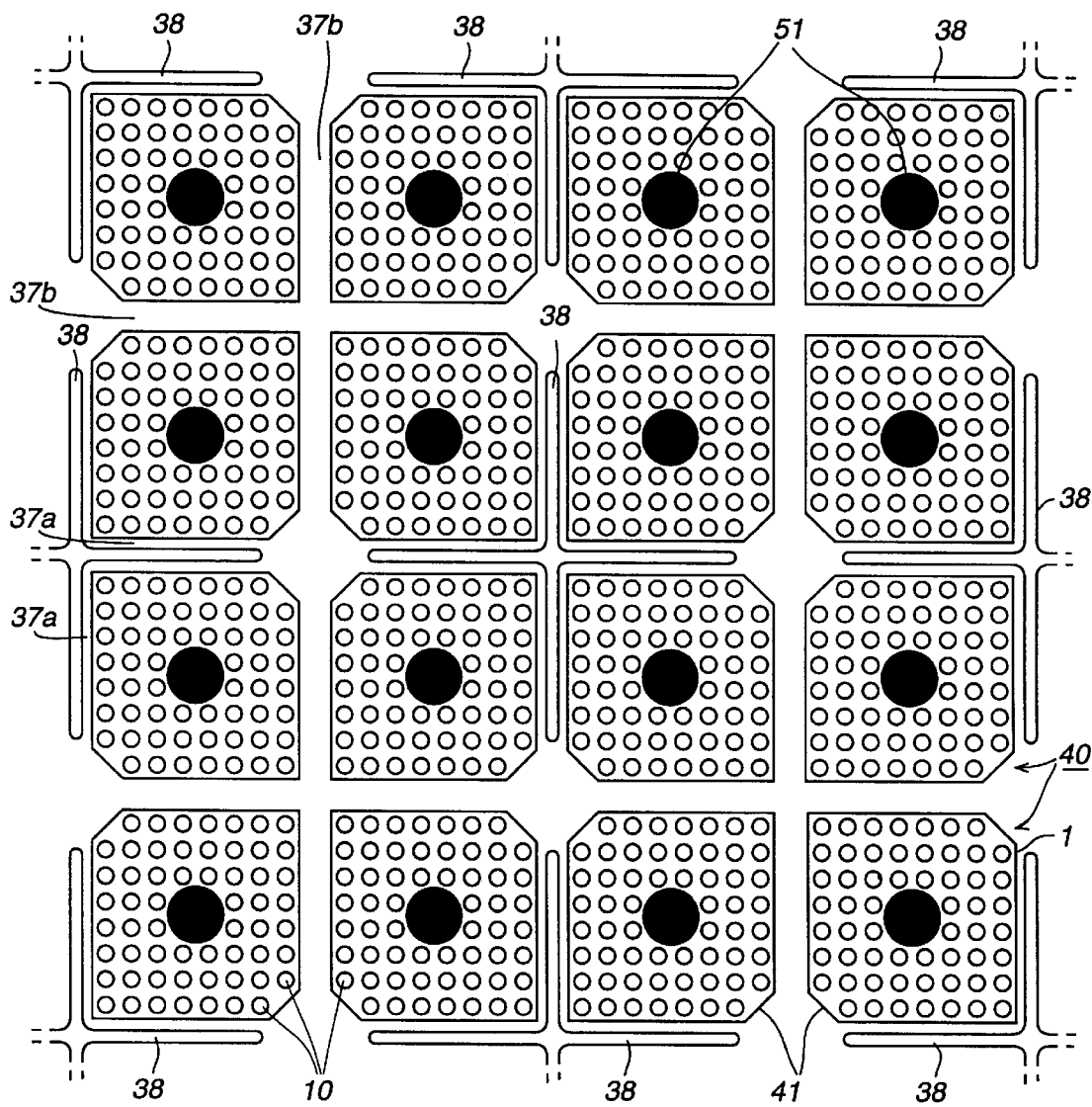
Figure 14:
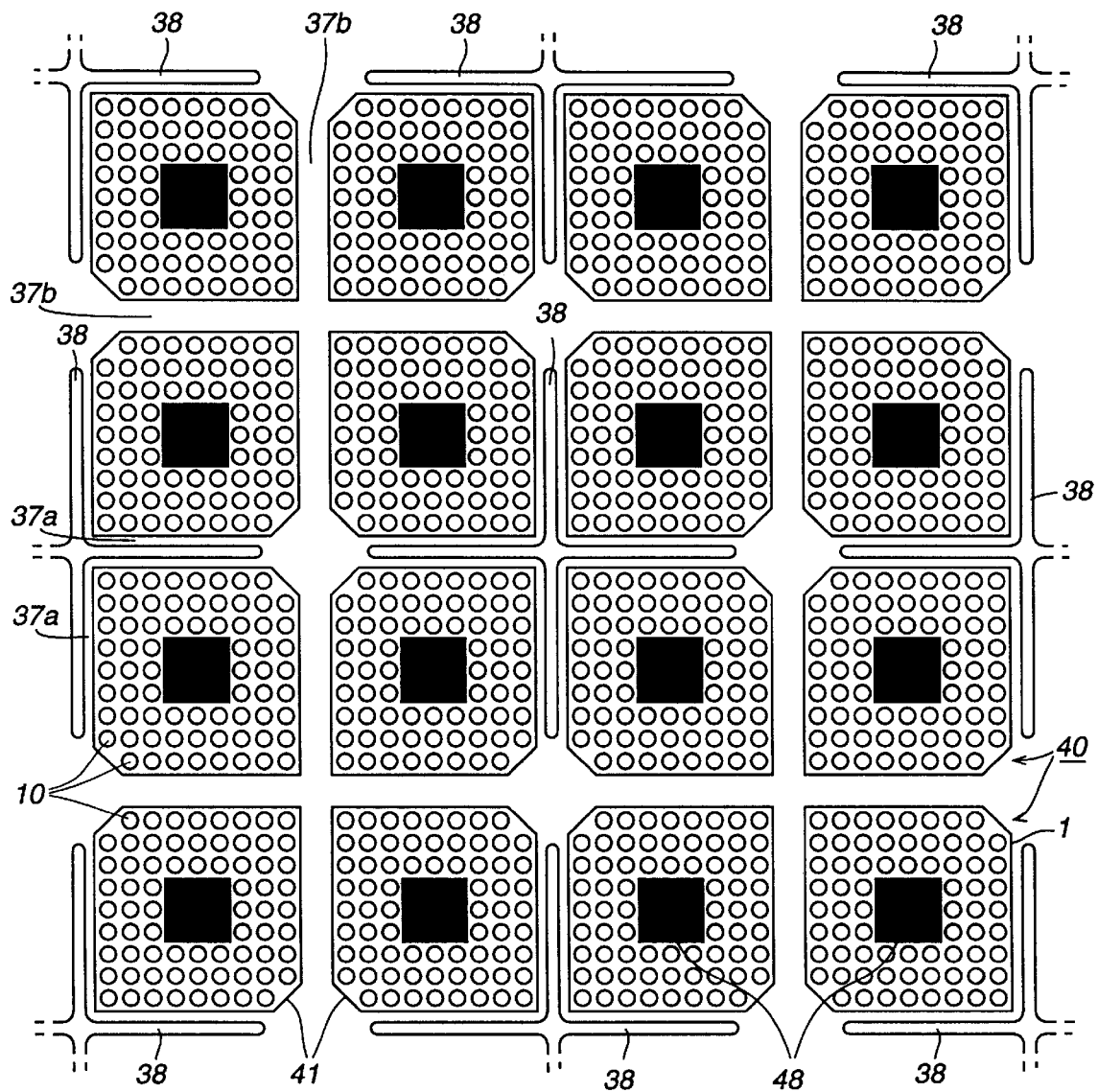

FIGS. 12, 13 and 14 illustrate in a symmetrical core lattice fuel assemblies 40 with two reduced corner portions 41. The reduced corner portions consist of the two corners which are arranged at the same distance from the control rod 38. This symmetrical corner reduction (with respect to a sub-assembly) is particularly suitable for symmetrical core lattices. The shutdown margin is considerably improved by the introduction of more water into the core. Another advantage of this embodiment is that the signal from a possible detector, arranged between the supercells at a maximum distance from the centre of the control rod 38, is not affected by the corner reduction. The fuel assembly 40 according to FIG. 12 is of the same type as those shown in FIGS. 6 and 9. The fuel assembly 40 according to FIG. 13 is provided with an internally arranged vertical channel 51, through which water is led in a vertical direction from the bottom and upwards through the assembly 40. The channel 51 has a substantially circular cross section corresponding to four removed fuel rods 10 and is centrally located. FIG. 14 shows a fuel assembly 40 of the same type as in FIG. 7 but with a water channel 48 centrally located in the fuel assembly 40.

Figure 15:
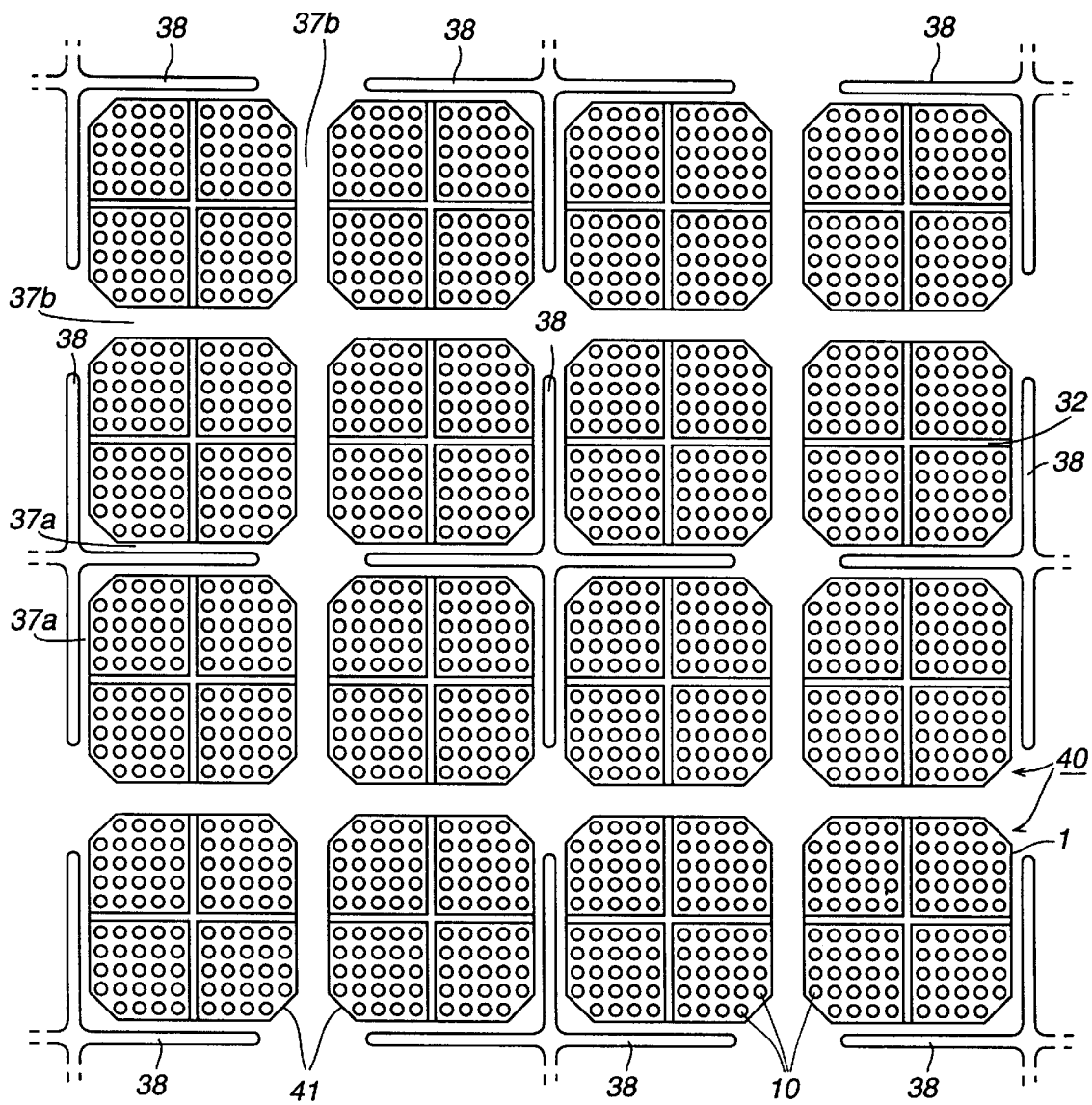

FIG. 15 shows a symmetrical core lattice with fuel assemblies 40 of the same type as those shown in FIGS. 4 and 10. The fuel assemblies 40 are each provided with four reduced corner portions 41. Thus, this embodiment differs from that shown in FIG. 10 in that also the inner tube, arranged at the shortest distance from the control rod 38, is reduced. Admittedly, the reduction of the corner facing the control rod 38 prevents the mean distance of the fissile material to the control rod from being reduced but has the advantage that the fuel rod 10 which is normally arranged in this corner is removed. This rod 10 is subjected to fast and considerable power variations in connection with the insertion and the withdrawal of the control rod, whereby it is very heavily loaded from the point of view of power. In certain cases, it may therefore be an advantage to remove this fuel rod 10 from the assembly 40. In addition, it is an advantage that the symmetrical enrichment distribution can be maintained when all the corners are reduced.

Figure 16:
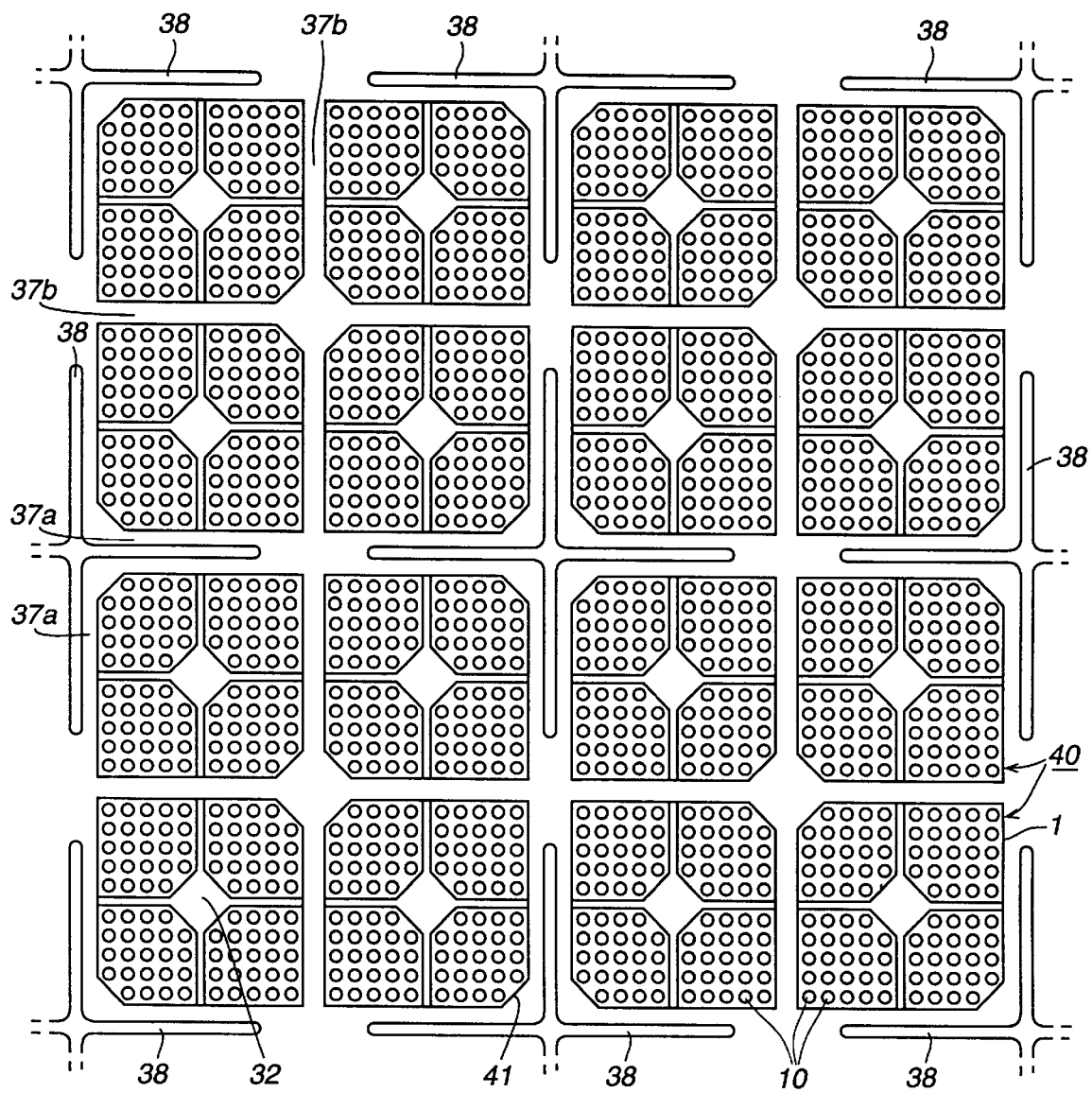

FIG. 16 shows an asymmetrical core with fuel assemblies 40 of the same type as those shown in FIGS. 6, 9 and 12. The fuel assemblies 40 are provided with two reduced corner portions 41, namely, those corner portions which are arranged at, respectively, the shortest distance and the longest distance from the centre of the control rod 38. This embodiment is advantageous from the same point of view as that stated with reference to FIG. 15, that is, that the sensitive rod 10 nearest the centre of the control rod 38 is removed.

Figure 17:
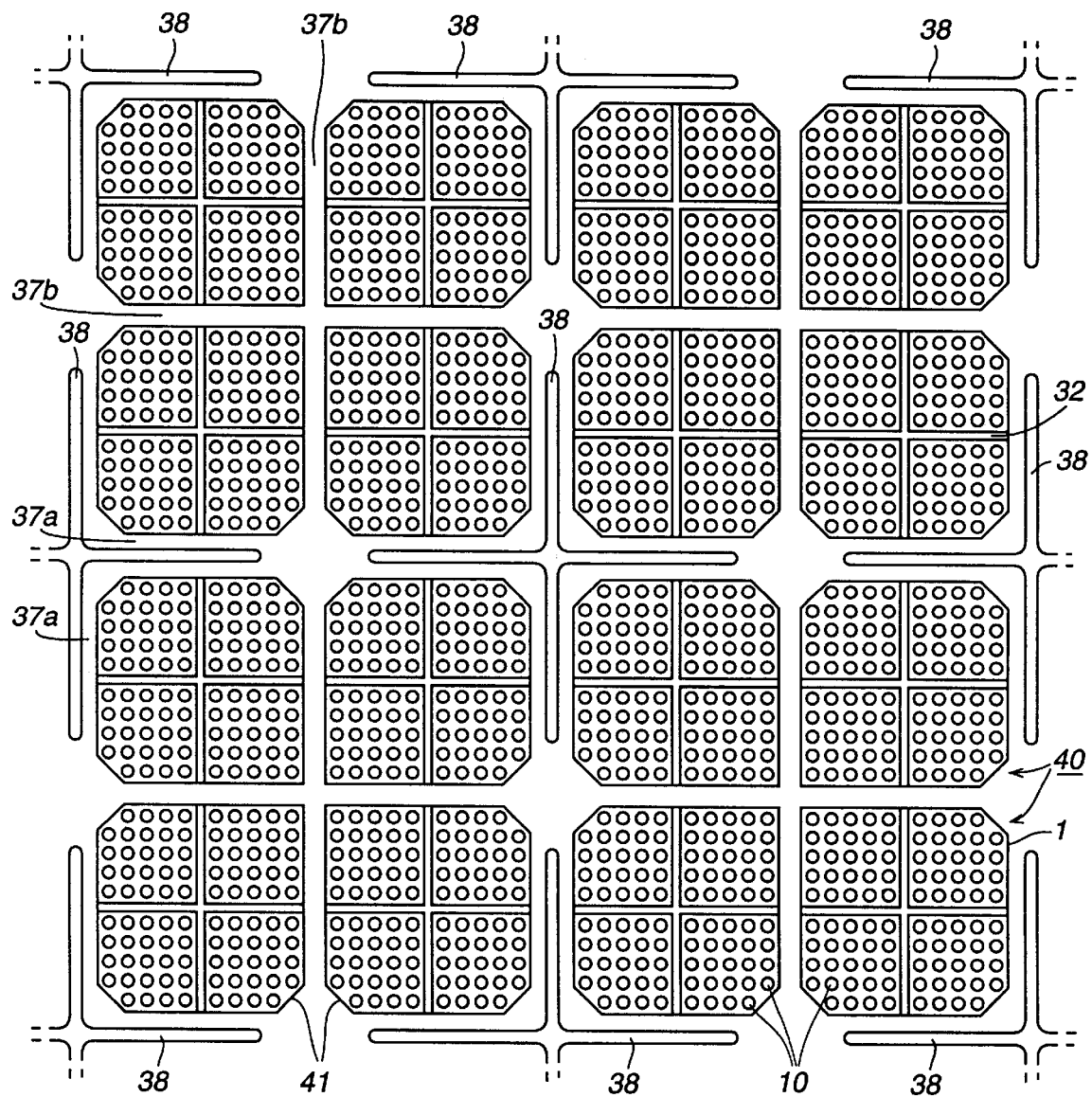

FIG. 17 shows an asymmetrical core lattice with fuel assemblies 40 of the same type as those shown in FIGS. 4, 10 and 15. The fuel assemblies 40 are provided with three reduced corner portions 41. The reduced corner portions 41 are arranged facing the centre of the control rod 38. A particular advantage of this embodiment, as well as in the cores shown in FIGS. 12, 13 and 14, is that the detector signal is not affected by the invention. In addition, the embodiment has the same advantage as the cores shown in FIGS. 15 and 16 in that the sensitive rod 10 nearest the centre of the control rod 38 is removed.

According to the particularly advantageous embodiment of the invention, that is, the embodiment shown in FIG. 6, the enrichment content B of those rods 10 which are arranged nearest the reduced corner portion 41 in a fuel assembly 40, with one fuel rod removed, is determined according to the following empirical relationship:

$$B = A \cdot F_k(F_S(a/b-1)+1)$$

where

B = enrichment content in a rod 10 arranged near a reduced corner portion 41 with one fuel rod removed A = enrichment content in the corresponding rod 10 in a non-reduced corner portion 41 in the fuel assembly 40 which is opposite to the reduced corner portion The factor $F_k$ describes how the ratio B/A is influenced by a reduced corner portion 41 in a lattice with symmetrical water gaps 37a, 37b The factor $F_S$ indicates a symmetry factor which describes how the ratio B/A is dependent on the ratio between the control rod gaps 37a and the narrow gaps 37b for a lattice with asymmetrical water gaps 37a, 37b a = gap width, control rod gap 37a b = gap width, narrow gap 37b.

In both symmetrical and asymmetrical core lattices, the factor $F_k$ for fuel assemblies in FIG. 6 is suitably chosen in the interval $0.72 \leq F_k \leq 0.92$ and $F_S = 0.72$.

In all the fuel assemblies 40 shown and in embodiments associated therewith, one or more corner portions 41 can be reduced such that an improved shutdown margin is obtained by letting more non-boiling water into the reactor core. One or more rods 10 at the reduced corner portions 41 are removed such that, at least in asymmetrical core lattices, fissile material is arranged nearest the control rod 38 such that an additionally improved shutdown margin is obtained by improved control rod effect.

We claim:

1. A reactor core for a boiling water nuclear reactor which includes four vertical fuel assemblies positioned around a control rod having arms that provide said control rod with a cruciform cross section, each of said four fuel assemblies being surrounded by a first and a second pair of gaps (37a–b) arranged transversely to and adjacent each other, which during reactor operation are filled with water, said first pair of gaps being adapted to encase two arms of said control rod, each fuel assembly (40) containing a plurality of fuel rods (10) containing enriched nuclear fuel material, said fuel rods being arranged between a bottom tie plate (11) and a top tie plate (12), wherein at least one fuel assembly comprises a substantially heptagonally formed fuel channel (1) with, in a cross section, four relatively long side portions and a first and a second and a third relatively short side portion, where said first short side portion faces said second pair of gaps where these are transversely connected to each other and said second and third short side portions, respectively, face said first and second pairs of gaps where they transversely communicate with each other.

2. A reactor core according to claim 1, wherein at least one of said four fuel assemblies comprises an integrally arranged channel (32, 48, 49, 50, 51) in the form of a hollow tubular member connected to said top and bottom tie plates for conducting water in a vertical direction from the bottom tie plate upwards through the core.

3. A reactor core according to claim 2, wherein said integrally arranged channel is a sub-channel-forming support member of cruciform cross-section spacing apart four sub-bundles of fuel rods within said one fuel assembly from each other, said cruciform support member constituting a central water passage in the space defined by removing one fuel rod from each of the corner portions of said sub-bundles directed towards the centre of a fuel channel box.

4. A reactor core according to claim 1, wherein said first pair of gaps are wider than said second pair of gaps and encase said two arms of a control rod.

5. In a boiling water nuclear reactor which includes a reactor core containing a plurality of vertical fuel assemblies, each fuel assembly including a bottom tie plate, a top tie plate, an outer channel, and a plurality of fuel rods within the outer channel and extending between said bottom and top tie plates, each fuel assembly being surrounded by first and second pairs of gaps arranged transversely to and adjacent each other, said gaps being filled with water when said reactor is operating, and a control rod having a cruciform cross section, two arms of which are located in a first pair of gaps, the improvement wherein the outer channel of one of said fuel assemblies has seven sides, four of said seven sides having a greater width than a fifth, sixth or seventh of said seven sides, said fifth side facing said second pair of gaps where said second pair of gaps transversely connect to each other and said sixth and seventh of said seven sides respectively face said first and second pairs of gaps where they transversely communicate with each other.

6. A reactor core for a boiling water nuclear reactor which includes four vertical fuel assemblies (40) positioned around a control rod having arms that provide said control rod with a cruciform cross section, each of said four fuel assemblies being surrounded by a first and a section pair of gaps (37*a–b*) arranged transversely to and adjacent each other, which during reactor operation are filled with water, said first pair of gaps (37*a*) being adapted to encase two arms of said control rod, each fuel assembly (40) containing a plurality of fuel rods (10) containing enriched nuclear fuel material, said fuel rods being arranged between a bottom tie plate (11) and a top tie plate (12), wherein at least one fuel assembly comprises a fuel channel which in cross section has seven sides, at least one of said sides being shorter than any of the remaining sides constituting a substantially square-formed fuel channel, said at least one short side facing said second pair of gaps (37*b*) where they transversely communicate with each other.

\* \* \* \* \*